(No Model.)
W. C. RARIG.
JOINT AND BEARING.
No. 549,294. Patented Nov. 5, 1895.
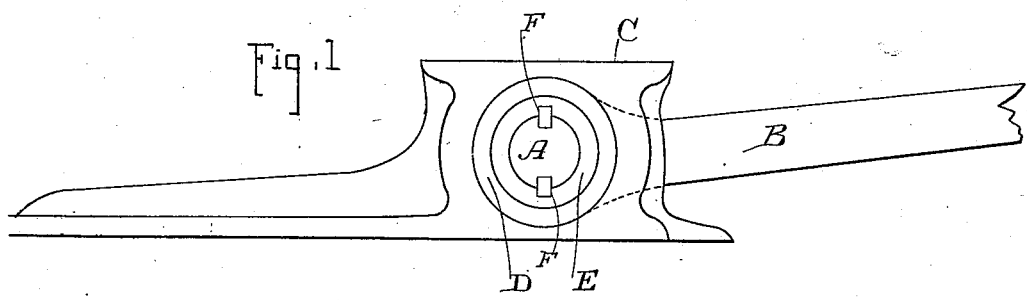
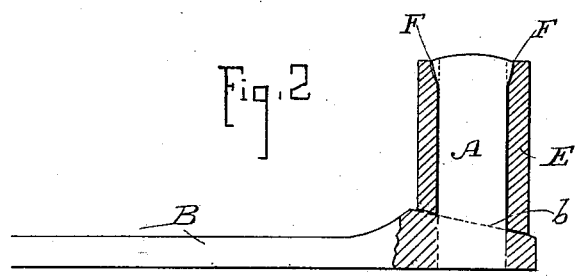
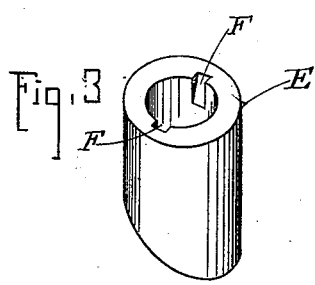
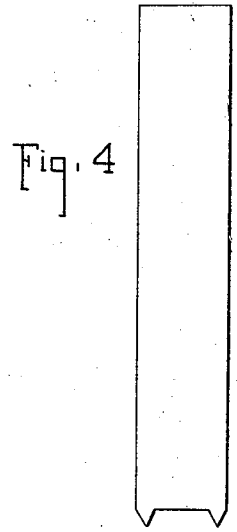
Witnesses:
Inventor,
Weldon C. Rarig
By Dewey & Co.
Attys

UNITED STATES PATENT OFFICE.

WELDON C. RARIG, OF SAN FRANCISCO, CALIFORNIA.

JOINT AND BEARING.

SPECIFICATION forming part of Letters Patent No. 549,294, dated November 5, 1895.

Application filed March 19, 1895. Serial No. 542,384. (No model.)

*To all whom it may concern:*

Be it known that I, WELDON C. RARIG, a citizen of the United States, residing in the city and county of San Francisco, State of California, have invented an Improvement in Joints and Bearings; and I hereby declare the following to be a full, clear, and exact description of the same.

My invention relates to an improved joint and bearing.

It consists in certain details of construction, which will be more fully explained by reference to the accompanying drawings, in which—

Figure 1 is an elevation showing an end view of the joint and one manner of securing the sleeve to the joint-pin. Fig. 2 is a side view showing another means for securing the sleeve. Fig. 3 is a separate view of the sleeve. Fig. 4 represents a tool, to be hereinafter referred to.

The object of this invention is to provide an improved means for securing the removable bushings which are employed in a joint to preserve the main parts of the joint from wear, and these means for securing prevents the bushing from being loosened on the pin by the movement of the parts or by other causes.

In the construction of moving joints which are subject to high speed and frequent sudden reversal of motion bushings or sleeves are employed, one fitting the pin which forms part of the joint and the other the interior of the openings within which the pin works. These two sleeves are intended to be secured firmly to their respective parts, so that all motion and wear will take place between the two; but the high speed and the frequent rapid change of direction will in time cause an enlargement of the sleeve or bushing which fits the pin, so that it will become loose upon the pin and if not corrected will either altogether come off or become so loose that motion will take place between it and the pin, when the protection of the bushing will be lost. In order to overcome this difficulty, I have devised an improved means for securing the bushing to the pin.

In the drawings, A is the pin fixed to an arm B, and C is the part into which the pin projects, so that movement of one is communicated to the other. Within the part C is fitted a sleeve or bushing D, which may be secured in any suitable or desired manner. Upon the pin is secured a sleeve or bushing E. This bushing may be made cylindrical and having the ends parallel and at right angles with the axis of the pin, or the inner end may be inclined to fit a corresponding inclination of the end of the arm to which the pin is fixed, or the parts may have a projection and corresponding indentation in their meeting faces to engage with each other. If the sleeve be made cylindrical, with parallel ends, as first stated, I make one or more slots or channels F in the outer end. The end of the pin is approximately flush with the outer end of the sleeve, and it is locked to the sleeve by indenting it so as to expand a portion of the periphery and cause the expanded portion to fit into the slot or channel formed in the end of the sleeve. This forms a lock or key, which will prevent the sleeve from turning upon the pin, so that it may be loosened thereon, as previously described, and holds the meeting faces in firm contact. The end of the pin may be expanded or enlarged to lock the bushing by any suitable tool, one form of which is illustrated at Fig. 4.

If preferred, one or more projections and corresponding indentations may be made upon the inner end of the sleeve and the corresponding face of the arm B, against which it abuts, and the outer end of the pin may be either locked to the bushing in the same manner as previously described, or it may be headed down or expanded all around the periphery for the same purpose.

In Fig. 2 I have shown the arm B having an inclined or beveled surface *b* where the pin joins it, and in this case the sleeve is correspondingly inclined or beveled, so as to fit against this surface. The outer end of the pin may then be secured by heading or expanding the whole or a portion of the periphery of the pin, so as to prevent the sleeve from slipping outwardly, and the meeting inclined surfaces will prevent the sleeve from turning upon the pin if it ever becomes loosened.

Having thus described my invention, what I claim as new, and desire to secure by Letters Patent, is—

1. A pin adapted to form a joint connection, a sleeve fitting upon said pin, a lock at the outer ends of pin and sleeve to keep them from moving upon one another in the line of their axes and a lock at their inner ends to keep them from turning axially with respect to each other, said last named lock consisting of the inclined end of said sleeve and the correspondingly inclined face of the pin arm.

2. A pin adapted to form a joint connection, a sleeve fitting upon said pin, a lock at the outer ends of the sleeve and pin, said lock consisting of depressions normally formed in the inner walls of the sleeve and burrs in the pin expanded into said depressions, and a second lock at the opposite ends of the sleeve and pin.

3. In a joint bearing, a pin projecting from an arm adapted to fit within a corresponding hole in the connecting part, a sleeve fitting the pin immovably, said sleeve having its exterior surface movable within the hole in the connecting part of the joint, the inner end of said sleeve being inclined with the axis of the pin and fitting against the corresponding inclined surface of the arm to which the pin is fixed, and a lock whereby the sleeve and pin are united together.

In witness whereof I have hereunto set my hand.

WELDON C. RARIG.

Witnesses:
S. H. NOURSE,
H. F. ASCHECK.